United States Patent [19]

Sanders

[11] Patent Number: 4,629,431
[45] Date of Patent: Dec. 16, 1986

[54] GAME FOR TEACHING TIME CONCEPTS

[76] Inventor: Susan Sanders, 21 S. Brooklyn Ave., Wellsville, N.Y. 14895

[21] Appl. No.: 790,851

[22] Filed: Oct. 24, 1985

[51] Int. Cl.⁴ .................................................. G09B 19/12
[52] U.S. Cl. ................................ 434/304; 273/157 R; 434/204
[58] Field of Search ................................ 434/304, 204; 273/157 R

[56] References Cited

U.S. PATENT DOCUMENTS

| | | | |
|---|---|---|---|
| 401,043 | 4/1889 | Manning | 434/304 |
| 802,807 | 10/1905 | Fitch | 434/304 |
| 2,443,468 | 6/1948 | Madden | 434/304 |
| 2,647,330 | 8/1953 | Ford | 434/304 |
| 3,022,582 | 2/1962 | Pitt | 434/304 |
| 3,430,363 | 3/1969 | Della Gala | 434/204 |

FOREIGN PATENT DOCUMENTS

| | | | |
|---|---|---|---|
| 559813 | 7/1958 | Canada | 434/304 |
| 964451 | 7/1964 | United Kingdom | 434/304 |
| 1580737 | 12/1980 | United Kingdom | 434/204 |

*Primary Examiner*—William H. Grieb
*Attorney, Agent, or Firm*—St. Onge Steward Johnston & Reens

[57] ABSTRACT

An educational game is described for teaching time concepts (e.g., hours in a day, days in a week and month, calendar months, and seasons). The game comprises puzzle pieces which can be assembled in interconnecting relationship in inner and outer bands. The pieces in one band designate seasons and the pieces in the other designate calendar months. The individual pieces are so configured that assembly thereof is only possible if the seasons and the months are both in the correct sequence and the interrelationship between the seasons and the calendar months corresponding to each season is established correctly. The pieces designating months house removable pegs or like markers corresponding in number to the days in the designated months and removable for placement on associated calendar month matrices.

An optional feature of the same is a day rod advantageously adapted to be mounted within the inner band of puzzle pieces. The day rod comprises a rod-like member adapted to receive beads or like pieces representing the 24 hours of the day and optionally color coded to distinguish ante-meridian from post-meridian hours.

22 Claims, 5 Drawing Figures

GAME FOR TEACHING TIME CONCEPTS

FIELD OF THE INVENTION

This invention relates to educational games and is more particularly concerned with a game comprising a plurality of puzzle pieces the assembly of which into a completed structure constitutes an exercise in learning certain concepts of time.

DESCRIPTION OF THE PRIOR ART

A wide variety of devices have been described hitherto to aid in teaching one or more elements employed to measure the passage of time. One of the simplest and most widely known of such devices is the simulated clockface with movable hour and minute hands employed to teach children to read time as shown by an actual clock (non-digital). More sophisticated devices have been described which are designed to teach the relationship between various time periods such as hours, days, months, seasons, years and the like.

Illustrative of the latter devices is that shown in U.S. Pat. No. 802,807 to Fitch which shows a puzzle game in which pieces representing seasons, months, and the number of the days in the month, can be assembled into a circle with concentric rings. The reverse sides of the various pieces are printed to show a clock face when correctly assembled. However, the various pieces in the circle and each of the concentric rings are substantially identical in configuration. Accordingly, the pieces for the circle and for each of the rings can be assembled in incorrect sequence of months, days, seasons, etc. Assembly in the correct sequence requires prior knowledge on the part of the puzzle solver. The puzzle cannot be utilized to teach the correct sequence to one who has no previous knowledge or understanding of the time concepts in question.

Canadian Pat. No. 559,813 to Ford shows a similar puzzle composed of pieces which can be assembled to form two concentric rings representing days of the week and months, respectively, and surrounding an inner star shaped piece. The pieces in each of the two separate rings can be fitted together irrespective of whether they are in the correct sequence due to the identity of the radially outwardly extending edges of the pieces in each ring; however, the inner and outer rings cannot fit together unless all the pieces in each ring are in the correct sequence. The fact that the pieces in the individual rings can be assembled in other than the correct sequence is taught to be advantageous.

The puzzle of the present invention has the advantage that it can only be assembled if all the pieces therein are fitted together in proper sequence. Thus the puzzle can be utilized in teaching time concepts to children who have no previous knowledge to assist in solving the puzzle correctly.

SUMMARY OF THE INVENTION

It is an object of the invention to provide a game to aid in learning a number of interrelated concepts of time measurement.

It is a further object of the invention to provide a game comprising a plurality of puzzle pieces which can only be assembled in a manner which correctly represents the interrelationship between various units in which elapsed time is measured.

It is yet a further object of the invention to provide a puzzle game which, when solved, accurately depicts the relationship between hours in a twenty four hour cycle, the number and names of days in a week and in a calendar month, the number and arrangement of the calendar months in a year and the relationship between the calendar months and the seasons.

These objects, and other objects which will become apparent from the detailed description which follows, are met by the game of the invention which, in its broadest aspect, comprises a plurality of discreetly configured puzzle pieces adapted to be assembled into a completed puzzle having interconnected inner and outer continuous bands. The inner band comprises interlocking pieces each of which carries indicia designating a different one of the four seasons of the year. The outer band comprises interlocking pieces each of which carries indicia designating a different one of the twelve calendar months. The various pieces are so configured that they can only be assembled in interlocking relationship when positioned in the correct sequence of calendar months in the outer band and seasons in the inner band and with the correct alignment of calendar months in the outer band with corresponding seasons in the inner band.

In an optional feature of the game of the invention, marker means such as pegs are provided for insertion into appropriate sockets on the various puzzle pieces designating calendar months, the number of such markers on each such piece corresponding to the number of days in the month in question. The markers are adapted to be removable from said pieces for installation in squares or like areas shown in a grid on an associated calender month matrix said grid displaying the day in the calendar month arranged in rows of weeks. Tiles or like pieces, each bearing indicia designating one of the days of the week are adapted to be installed on said grid. Optionally, these tiles are configured so that they can only be assembled on said grid in the correct sequence. Alternatively, the individual tiles are replaced by a single block having all the days of the week marked thereon in correct sequence.

In yet another optional, but preferred, feature of the game of the invention, a device is provided which serves to relate to hours of the day to a twenty-four hour cycle. This device comprises an elongated housing member substantially vertically disposed and adapted to receive along its length a series of twenty four pieces each bearing indicia indicating a different hour of a twenty four hour cycle. Those pieces designating ante-meridian hours are, optionally, coded by color or like distinguishing means to differentiate them from those pieces designating post-meridian hours. Advantageously, this device is adapted to be installed within the inner band of puzzle pieces of the game of the invention.

DETAILED DESCRIPTION OF THE INVENTION

The invention will now be illustrated with specific reference to the embodiments shown in the accompanying drawings.

Figure 1:
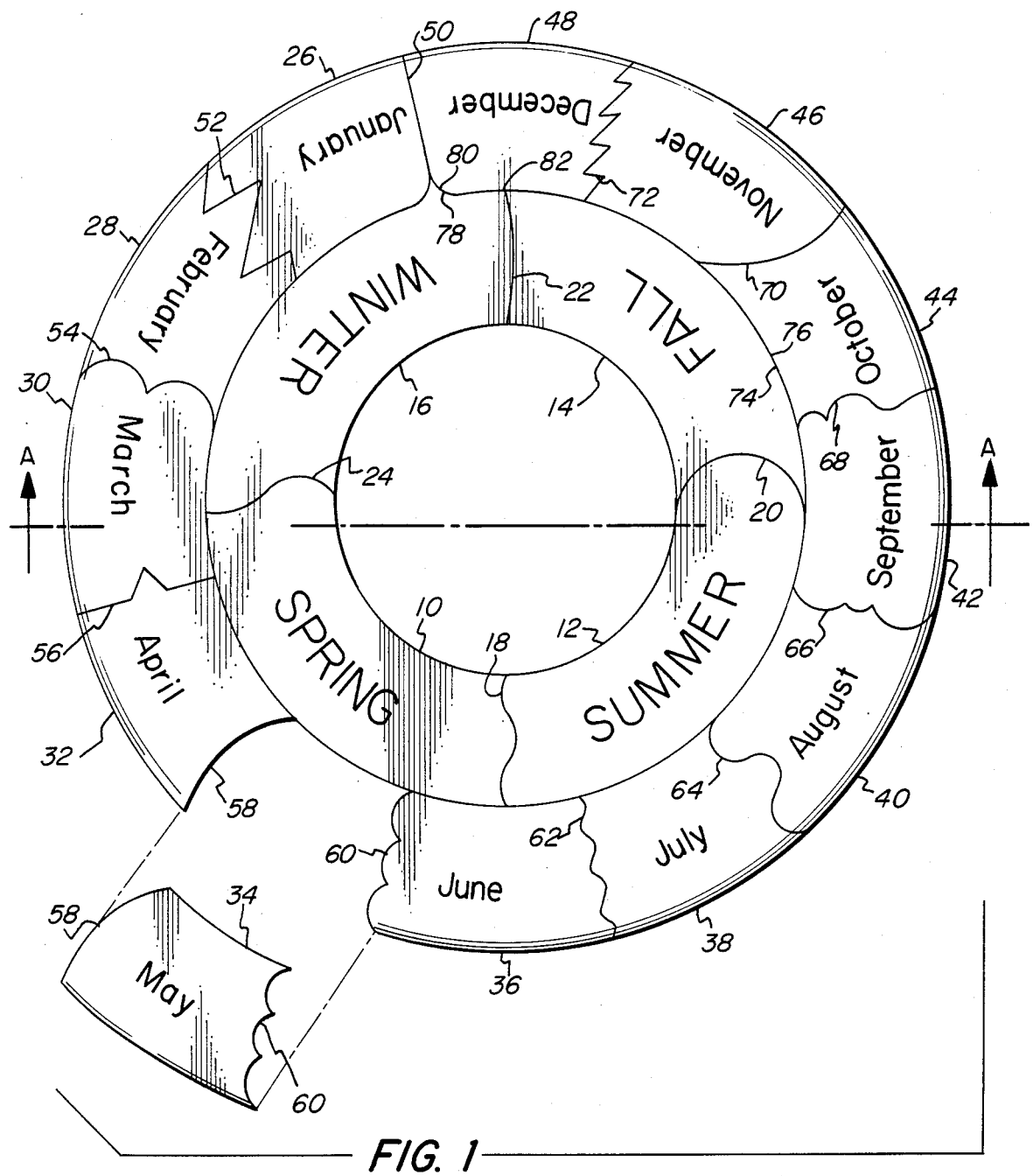
FIG. 1 shows a plan view of an embodiment of a game according to the invention substantially fully assembled.

Referring firstly to the plan view of a game according to the invention shown in FIG. 1, interlocking pieces 10, 12, 14 and 16, bearing lettering identifying the seasons SPRING, SUMMER, FALL and WINTER respectively, form the inner ring of the puzzle. Each of the abutting edges 18, 20, 22 and 24 which are shared by the adjoining pieces is configured differently from any of the other three such edges. Accordingly, the four pieces can only be assembled into a complete ring when fitted together in the proper sequence of the seasons. Optionally the four pieces 10, 12, 14 and 16 can be distinguished from each other by color coding.

The outer ring of the game shown in FIG. 1 is composed of a series of twelve pieces 26, 28, 30, 32, 34, 36, 38, 40, 42, 44, 46 and 48 each of which bears lettering identifying the twelve months of the year in correct sequence. Piece 34 which bears the lettering MAY is shown detached from the ring for purposes of illustration. The shared abutting edges 50, 52, 54, 56, 58, 60, 62, 64, 66, 68, 70, and 72 of the twelve pieces are each configured differently from any other of the abutting edges thereby ensuring that these various pieces can only be assembled into the outer ring when fitted together in the proper sequence of the months.

The outer perimeter 74 of the inner ring is in abutting relationship with the inner perimeter 76 of the outer ring throughout the whole of the two perimeters. Further the triangular projection 78 on the outer edge of puzzle piece 16 engages the corresponding shaped recess 80 on the inner perimeter of the outer ring, wherein said recess is formed by appropriate configuration of the inner side of the abutting edge 50 of pieces 26 and 48. As will be apparent to one skilled in the art, the interlocking arrangement of the projection 78 and the corresponding recess 80 serves to ensure that the inner and outer rings can only be assembled together if the pieces in the inner and outer rings are assembled in the proper sequences of seasons and months, respectively, and, further, if the correct relationship is established between the seasons in the inner ring and the corresponding months in the outer ring. Illustratively, the abutting edges 22 shared by the pieces 14 and 16 designating the transition from FALL to WINTER. The outermost point of said edge 22 meets the inner edge of piece 48 designating the month of DECEMBER at a point 82 representing the beginning of WINTER, i.e., DECEMBER 21.

Figure 1A:
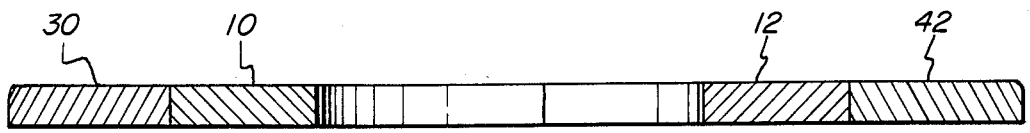
FIG. 1A is a cross-sectional view taken along the line A—A of the embodiment shown in FIG. 1.

FIG. 1A is a cross-sectional view of the embodiment shown in FIG. 1 taken along the line A—A and showing pieces 30, 10, 12 and 42 in cross-section. Advantageously each of the puzzle pieces is fabricated from wood of relatively thin thickness but fabrication can also be done from other materials such as fiberboard, plastic, and the like.

Figure 2:
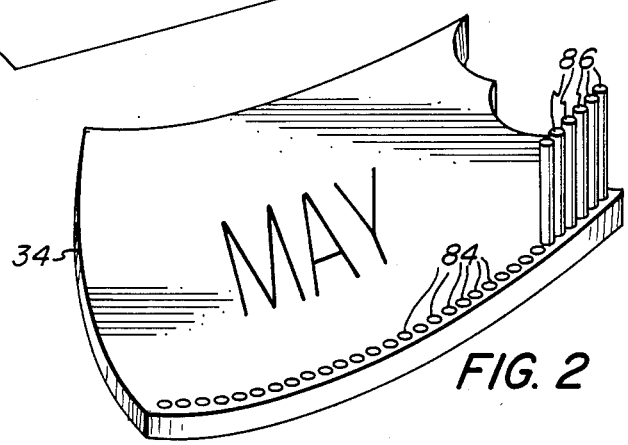
FIG. 2 is a modified form of a puzzle piece taken from the embodiment shown in FIG. 1.

FIG. 2 shows a perspective view of a modification of the embodiment of the puzzle piece designated 34 bearing the lettering MAY in FIG. 1. In this modification a plurality of sockets 86 are provided advantageously on the outer perimeter of the piece 34, each of the sockets being adapted to receive a peg 86 of which only six out of the total 31 are shown installed in sockets. The total number of sockets and corresponding pegs is equal to the number of days in the month which, in the case of MAY, is 31. Each of the other puzzle pieces in the outer ring of the game shown in FIG. 1 can also be provided with the appropriate number of sockets and pegs corresponding to the number of days in the particular month represented by the piece in question. In the case of the piece 28 designating February a total of 29 sockets and pegs is provided and one of the pegs is markedly distinctively, as by color coding or the like, to designate the extra day present in a leap year.

While the sockets 84 and corresponding pegs 86 are shown as disposed along the outer edge of piece 34 in FIG. 2 it will be apparent that other patterns of distribution of the sockets and pegs on said piece can be employed. The particular arrangement shown in FIG. 2 is given for purposes of illustrations only and is not intended to be limiting.

Figure 3:
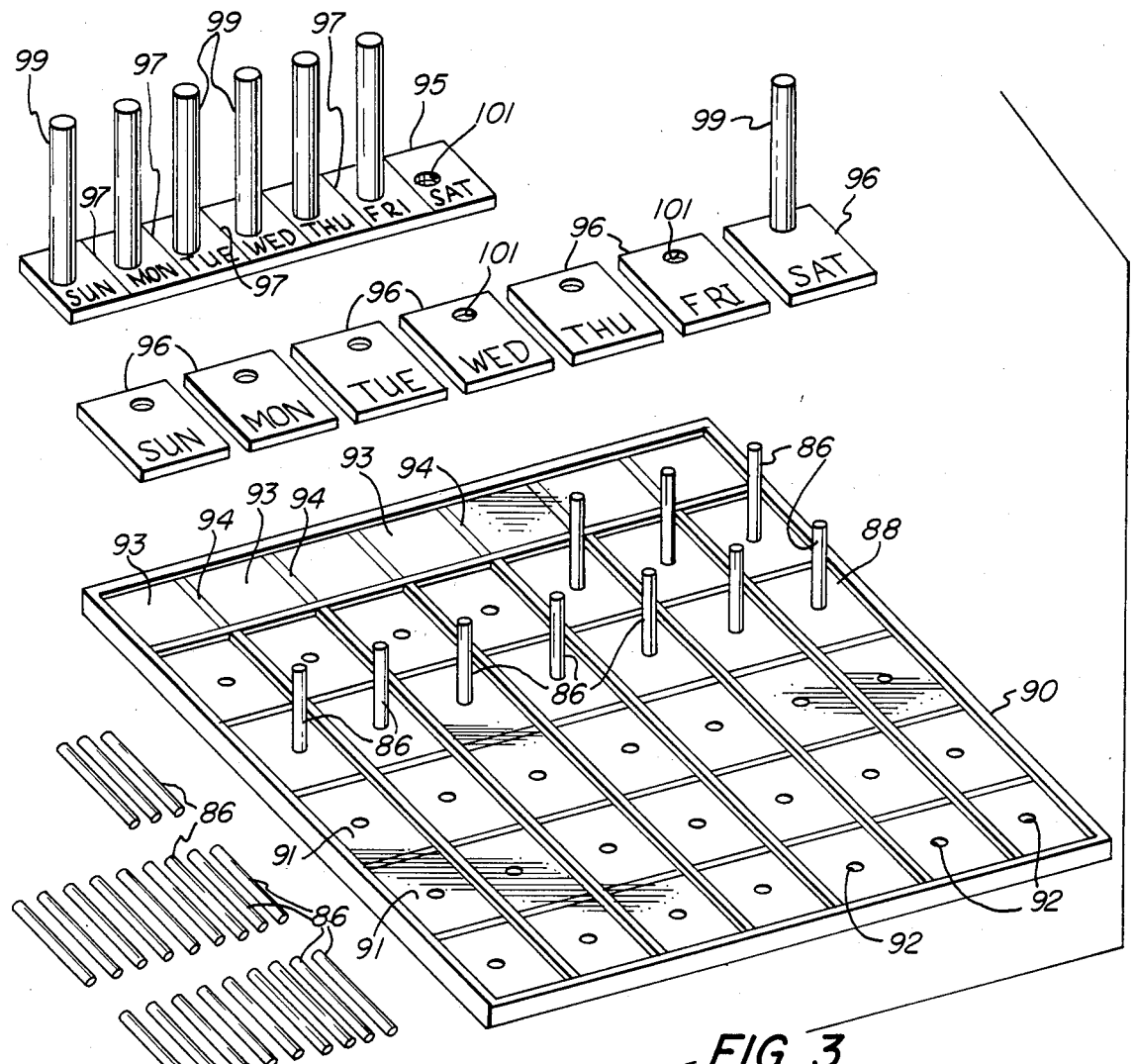
FIG. 3 is a perspective view in partially exploded form of an embodiment of a calendar month matrix in accordance with the invention.

FIG. 3 shows a perspective view of a calender matrix, shown generally as 88, which is an optional but preferred feature of the game of the invention employed in association with the embodiment of the game illustrated in FIG. 1. The matrix 88 comprises a planar board 90 on which is marked a grid of 35 squares 91 shown in 5 rows of 7 squares each. Each square 91 has a socket 92 disposed substantially in the center thereof and adapted to receive a peg 86 which can be transferred from the puzzle piece, such as 34, representing a month as shown in FIGS. 1 and 2. In an optional feature of the invention, the pegs 86 are replaced by a series of tiles or like pieces (not shown) each of which is marked with a number from 1 to 31 and adapted to be placed in correct sequence in appropriate squares 91 to designate the days in the particular month being represented.

The board 90 has disposed, along an edge which parallels the rows of 7 squares, a series of compartments 93 marked off by a series of lines 94 and adapted to receive a series of blocks or tiles 96 each of which carries lettering designating a day of the week. Alternatively, block 95 having marked thereon, by means of a series of lines 97, seven compartments each carrying lettering designating the days of the week in correct order, can be placed at the head of the board 90 instead of the individual tiles 96. Optionally, the individual tiles 96 and the block 95 are provided with sockets 101 for receiving pegs 99 thus providing an additional means of learning the correct sequence of the days of the week. Illustratively, by transferring each peg 99 from its position in the block 95 to the corresponding marked tile 96, the pupil learns the correct sequence of days. The reverse of this process serves the same purpose. To aid in this particular learning process the individual pegs 99, the corresponding day space on the block 95 and the day tile corresponding to said space can be color coded identically to distinguish each day of the week and its peg from all the other days and pegs.

Figure 4:
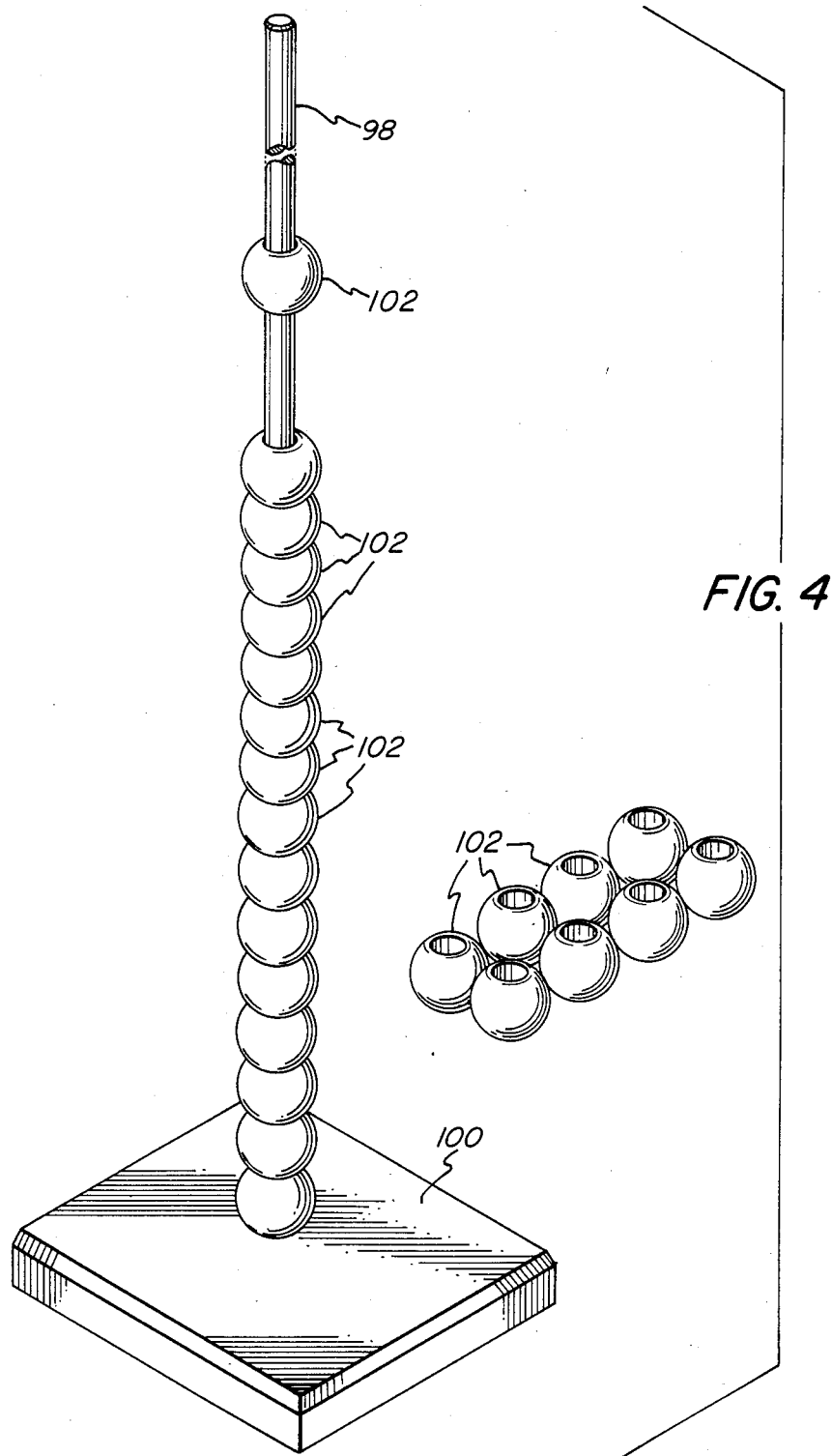
FIG. 4 is a perspective view of an embodiment of a day rod in accordance with the invention.

FIG. 4 illustrates an embodiment of a day rod which is an optional, but preferred, feature of the game of the invention. An elongated rod 98 mounted on base 100 is adapted to receive a total of 24 beads 102 which can optionally carry indicia showing a particular hour in a 24 hour cycle. The twelve beads 102 which carry indicia corresponding to ante-meridian hours, can, if desired, be distinguished from those representing indicia corresponding to post-meridian hours by color coding or like means. In an optional feature of the invention, the base 100 of the day rod is adapted to be mounted within the inner ring of the game shown in FIG. 1 and, in a particular embodiment, the base 100 is circular and has a diameter corresponding to that of the inner perimeter of the inner ring of the game of FIG. 1 so that the base 100 can be received in close fitting relationship in the center of the game.

It will be apparent from the foregoing description that the game device of the invention can be employed to teach various concepts of time and unit of measuring of time. Thus, embodiments of the invention such as that shown in FIG. 1 can be employed to teach the correct sequence of months in a year and the correlationship between months and seasons of the year. The modification shown in FIG. 2 can be employed to teach the number of days in each month and, when used in conjunction with a calendar month matrix such, as shown in FIG. 3, to teach the relationship between days of the week, and the disposition of the days in a particular month within the matrix in any given year. Finally the day rod, as illustrated in FIG. 4, serves to show the passage of hours in a twenty four cycle and can be correlated with other teaching aids such as simulated clock faces and the like.

The educational game of the invention has been illustrated by various specific embodiments described above. It is to be understood that these embodiments have been given for purposes of illustration only and the scope of the invention is not to be limited thereby. Various modifications and changes can be made in the structures described above without departing from the spirit of the invention.

What is claimed is:

1. An educational game to aid in learning time concepts which game comprises;
   a plurality of discreetly configured puzzle pieces having means for assembly to form a structure;
   a first continuous band of interlocking pieces, each piece of said band bearing indicia designating a different one of the seasons of the year;
   a second continuous band of interlocking pieces, each piece of said second band bearing inidica designating a different one of the calendar months;
   said pieces forming said first and second bands being adapted to be assembled in interlocking relationship only when positioned in the correct sequence of calendar months and seasons and the correct alignment of calendar months in the second band with corresponding seasons in the first band.

2. An educational game according to claim 1 wherein said individual pieces representing calendar months are provided with housing means for receiving marker means corresponding in number to the number of days in the respective month represented by each of said pieces of the second band.

3. An educational game according to claim 2 and further including a calendar month matrix and wherein said marker means are pegs removable for placement in holes disposed in an associated calendar month matrix.

4. An educational game according to claim 3 wherein said associated calendar matrix is also provided with removable means for designating days of the week.

5. An educational game according to claim 4 wherein said means for designating days of the week are individual tiles each bearing indicia representing one day of the week.

6. An educational game according to claim 4 wherein said removable means is a single block bearing indicia representing each of the days of the week in correct sequence.

7. An educational game according to claim 1 wherein said first and second bands form concentric circles.

8. An educational game according to claim 7 wherein each of said pieces in said first and second bands have generally radially outwardly extending edges of different configurations so that the pieces of the first band and the pieces of the second band only fit together when the pieces are arranged in the proper sequence of seasons and months, respectively.

9. An educational game according to claim 1 wherein said first band fits within said second band.

10. An educational game according to claim 1 wherein said pieces in said first band are each distinguished from the others in said first band by color coding.

11. An educational game according to claim 1 which also comprises an additional member comprising elongated housing adapted to receive a series of twenty four pieces each of which is provided with indicia designating one hour.

12. An educational game according to claim 11 wherein said housing comprises a substantially vertical rod disposed along the length of the housing and said twenty four pieces are beads adapted to be slidably received on said rod.

13. An educational game according to claim 12 wherein said beads are color coded to distinguish those designating ante-meridian hours from those representing post-meridian hours.

14. An educational game according to claim 11 wherein said additional member is adapted to be disposed within said first band and interlocking pieces.

15. An educational game to aid in learning the Gregorian calendar and the interrelationship therewith of the seasons of the year, which game comprises a plurality of discreetly configured puzzle pieces adapted to be assembled to form a structure comprising interconnecting inner and outer concentric circles:
   said inner circle comprising four pieces each of which is provided with indicia designating a different season of the year;
   said outer circle comprising twelve pieces each of which is provided with indicia designating a different month of the year;
   said pieces in said inner and outer circles being so configured that they can be assembled in interlocking relationship, within each circle and between the circles, only when positioned in the correct sequence of calendar months in the outer circle and seasons in the inner circle and with the correct interrelationship of calendar months and seasons between the circles.

16. An educational game according to claim 15 wherein each piece in said outer circle has disposed thereon removable marker pegs corresponding in number to the number of days in the month which said piece is designated to represent.

17. An educational game according to claim 16 which also comprises at least one associated calendar month matrix adapted to receive said removable marker pegs.

18. An educational game according to claim 17 wherein said associated calendar month matrix comprises a board on which is marked a grid of squares designating days and weeks in a calendar month each of said squares having disposed therein a hole adapted to receive one of said marker pegs.

19. An educational game according to claim 18 wherein said associated calendar month matrix is also provided with detachable means for designating days of the week.

20. An educational game according to claim 15 which also comprises a substantially vertical rod adapted to receive a total of 24 beads.

21. An educational game according to claim 20 wherein those beads designating ante-meridian hours are distinguished from those designating post-meridian hours by color coding.

22. An educational game according to claim 15 wherein the four pieces forming the inner circle are distinguished from each other by color coding appropriate to the seasons.

* * * * *